Aug. 20, 1940.					G. F. DRAKE					2,211,769
CONTROL SYSTEM
Filed April 19, 1937
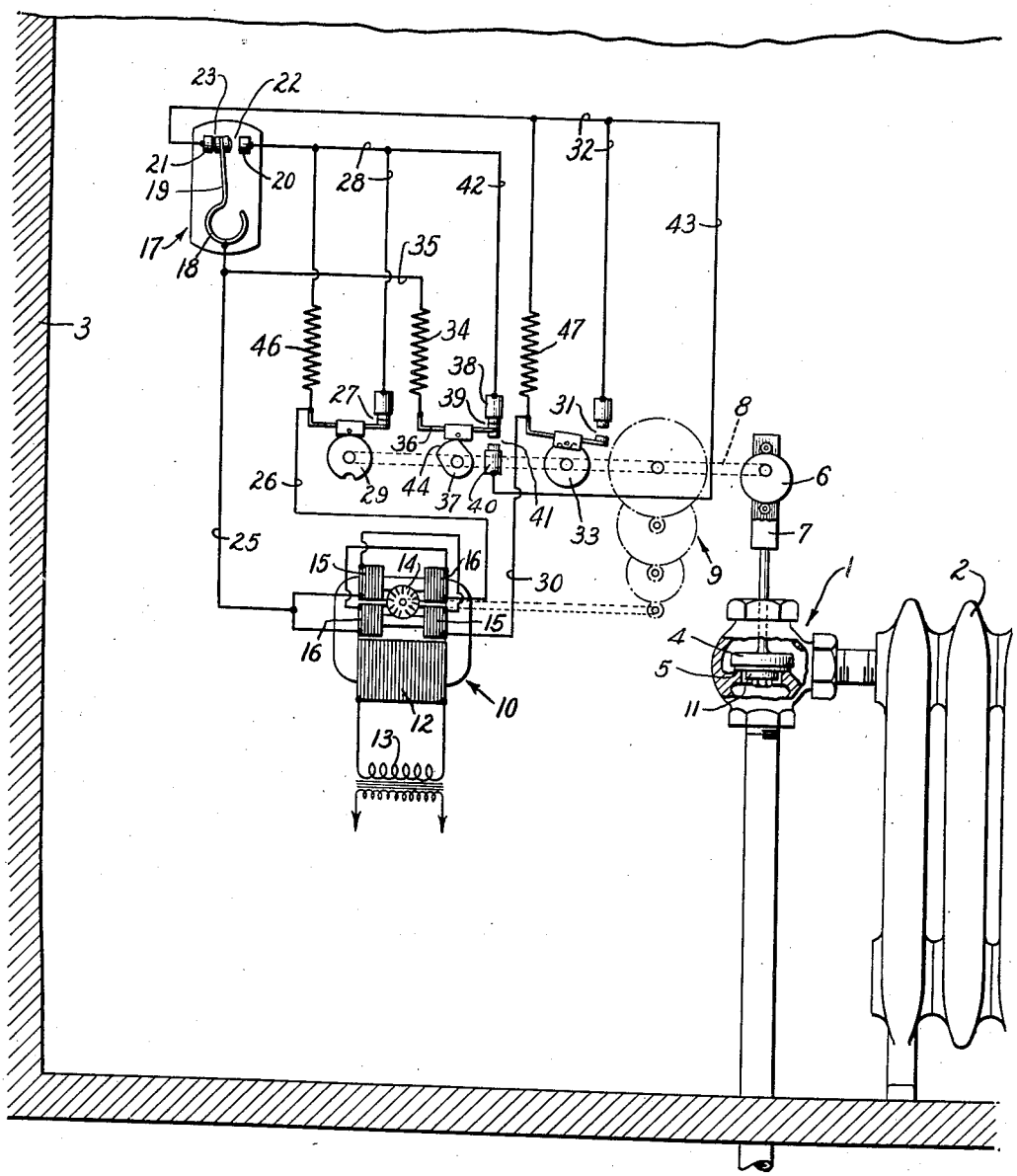
SOURCE OF HEATING FLUID
INVENTOR
George Forrest Drake
BY
*Parker, Carlson, Pitzner & Hubbard*
ATTORNEYS Patented Aug. 20, 1940

2,211,769

UNITED STATES PATENT OFFICE 2,211,769

CONTROL SYSTEM

George Forrest Drake, Rockford, Ill., assignor to Barber-Colman Company, Rockford, Ill., a corporation of Illinois Application April 19, 1937, Serial No. 137,660

6 Claims. (Cl. 236—76)

This invention relates to systems for controlling the movements of regulating members such as valves and dampers in air conditioning systems and the like and has more particular reference to the control of such members by an instrument such as a thermostat having two control switches. Instruments of this character are generally utilized in air conditioning systems to control the operation of a power operator by which a regulating member is moved uninterruptedly between two limit positions, for example, the open and closed positions of a valve.

The primary object of the present invention is to provide a novel system of the above general character by which a double switch control instrument may be utilized to cause movement of a regulating member to any one of three different positions whereby to enable the flow of a conditioning medium to be regulated with greater accuracy.

The invention also resides in the character of the improved control by which simplicity in construction and reliability in operation through long periods of service use are obtained.

Other objects and advantages of the invention will become apparent from the following detailed description taken in connection with the accompanying drawing which is a schematic view and wiring diagram of a temperature regulating system embodying the novel features of the present invention.

While the invention is illustrated in the drawing as applied to the actuation of the valve 1 controlling the flow of a heating medium to a radiator 2 for conditioning a room or other space within walls 3, it will be understood by those skilled in the art that the invention is equally applicable to the actuation of other regulating members. Accordingly, I do not intend to limit the invention by this illustrative disclosure but aim to cover all modifications and alternative constructions falling within the spirit and scope of the invention as expressed in the appended claims.

In the present instance, the regulating member of the valve proper, which comprises the disk 4 of the radiator valve, is arranged to be moved toward and away from a seat 5 by a reversible electric motor driven operator. The latter includes a cam 6 which acts on a follower 7 and is fast on a main operating shaft 8 driven through speed reduction gears 9 by an electric motor 10. The shape of the cam is such that the valve disk is moved from closed to open position as the shaft turns clockwise through a half revolution. Preferably, the disk is formed with a washer 11 smaller than the diameter of the seat 5 and projecting therethrough so that the degree of opening of the valve passage changes approximately in direct proportion to the extent of movement of the disk away from the seat.

The motor shown is of the shaded pole induction type having a main winding 12 constantly energized from a source 13 of alternating current. Arranged about a squirrel cage rotor 14 are two sets of shading coils or windings 15 and 16 which, when short-circuited, operate in a well known manner to induce clockwise or counterclockwise rotation of the rotor 14. The coils may be rendered operative singly or jointly to control the direction of movement of the valve. In case both coils are short-circuited simultaneously but differentially through circuits of different resistances, the rotor will turn in a direction determined by the coil which produces the predominating shading effect.

The sensitive instrument for controlling the operation of the motor comprises in the present embodiment a thermostat 17 of the double switch open contact type having a bimetallic element 18 carrying a tongue 19 which moves back and forth between two spaced contacts 20 and 21 in accordance with ambient temperature changes. The contacts cooperate with the tongue to form switches 22 and 23, the former of which is closed when the temperature of the element 18 falls below a value predetermined by the setting of the thermostat. The switch 23 becomes closed when the temperature rises above a predetermined higher temperature. At intermediate temperatures, the tongue contact is disposed between the fixed contacts and both of the thermostat switches remain open.

As applied to a system of the above character, the invention contemplates a control of the windings 15 and 16 in a novel manner such that the regulating member 4 is moved to one limit position in response to closure of one of the thermostat switches, is moved to the other limit position when the other thermostat switch is closed, and is moved to a position intermediate these limit positions when both of the thermostat switches are open. More specifically, the present arrangement provides for complete closure of the valve when the switch 23 becomes closed as the thermostat ceases to call for heat, movement of the valve member to a partially open position when the thermostat calls for heat as evidenced by opening of the switch 23 while the switch 22 is still open, and movement to fully open position when the thermostat calls for more heat by closing the switch 22.

To control the motor in the above manner, the shading windings of each set are connected in series relation, and one terminal of each set is joined to a common conductor 25 leading to the common contact of the thermostat switches. The insulated terminal of the windings 16 is connected to the fixed contact 20 of the thermostat switch 22 through a conductor 26, a limit switch 27, and a conductor 28. A cam 29 on the shaft 8 operates to maintain the switch 27 closed except when the valve member 4 is in fully open position. In a similar way, the windings 15 are connected through a conductor 30, a switch 31, and a conductor 32 to the fixed contact 21 of the thermostat switch 23. The switch 31 is held closed by a cam 33 except when the valve member is closed against its seat as shown.

Movement of the valve member to the fixed intermediate position in response to opening of either of the thermostat switches is effected through the provision of means which responds to movements of the valve member and operates, when the latter is moved out of the intermediate position by direct short-circuiting of one set of windings, to energize the other windings to a lesser degree which is nevertheless sufficient to cause reverse rotation of the motor when the then closed thermostat switch becomes opened. In the present instance, this action is obtained by short-circuiting the shading coils 15 and 16 selectively through a resistance element 34 having one terminal connected by a conductor 35 to the conductor 25. The other terminal is joined to a switch arm 36 movable by a cam 37 and carrying a contact which cooperates with a stationary contact 38 to form a switch 39 and with a second stationary contact 40 to form a switch 41. The contact 38 is joined by a conductor 42 to the conductor 28 so that the resistance 34 and the switch 39 are in parallel with the thermostat switch 22. The contact 40 leads through a conductor 43 and the conductor 32 to the thermostat switch 21. The cam 37 which is fast on the shaft 8 has a surface 44 which operates upon the follower arm 36 to maintain the switch 39 closed when the valve is closed as shown and also during clockwise rotation of the shaft 18 through a quarter revolution during which the valve member is moved to the intermediate position above referred to. When the valve member is disposed between the intermediate position and the fully open position, the cam 37 permits the switch 41 to remain closed, both of the switches 39 and 41 being open when the valve member is in the intermediate position.

From the foregoing, it will be apparent that when either of the thermostat switches 22 or 23 is closed and the valve member 4 is in any other than the intermediate position, both of the motor windings 15 and 16 will be short-circuited, one directly and the other through the resistance 34. The shading effects thus produced oppose each other and tend to cause the rotor 14 to turn in opposite directions, but owing to the predominating shading effect produced by the coils in the circuit of lesser resistance, the rotor will turn in a direction determined by these coils. Preferably the value of the resistance 34 is such that the motor will develop approximately half of its full torque when one of the shading coils alone is short-circuited through this resistance.

To prevent the possibility of continued oscillation of the valve member back and forth by opening and closing one of the limit switches when the valve member is moved to its limit position under the control of one of the thermostat switches, a resistance 46 is interposed between the conductors 26 and 28, and a similar resistance 47 is interposed between the conductors 30 and 32. The values of these resistance elements are approximately equal to that of the element 34. As a result, both of the windings 15 and 16 will, when the valve is in one of its limit positions with one of the thermostat switches closed, be short-circuited, one through the resistance 34 and the other through one of the resistances 46 or 47. Thus both of the windings will produce the same shading effects and the motor will remain idle until the then closed thermostat switches open in response to a temperature change.

Assuming that the parts are positioned as shown in the drawing, the operation of the control is as follows: Under these conditions, the thermostat switch 23 is closed and the coils 15 thus short-circuited through the resistance 47, the limit switch 31 then being open. Owing to the closed position of the valve member, the switch 39 is held closed by the cam 37 so that the windings 16 are short-circuited through the conductor 26, the switch 27, conductors 28 and 42, the switch 39, the resistance 34, and the conductors 35 and 25. The windings thus produce equal shading effects and the motor remains at rest. When the thermostat switch 23 opens in response to a fall in the space temperature, the circuit for the shading coils 15 is interrupted while the windings 16 remain short-circuited through the resistance 34 thereby causing the motor to operate in a direction to open the valve. Such movement continues uninterruptedly until the valve reaches the intermediate or half open position at which time the cam 37 permits the switch 39 to open thereby interrupting the circuit for the windings 16 to stop the motor, both sets of windings then being deenergized.

If the increase in the space temperature resulting from the delivery of heating medium with the valve partially open is sufficient to satisfy the thermostat, the thermostat again ceases to call for heat as evidenced by reclosure of the switch 23. This short-circuits the windings 15 to cause operation of the motor in a direction to close the valve. In the initial part of this movement the switch 39 becomes closed and the windings 16 short-circuited through the resistance 34, but the closing movement of the valve continues under the predominating shading effect of the windings 15.

If the rate of heat delivery with the valve partially open is not sufficient to satisfy the thermostat, the tongue thereof moves into engagement with the contact 20. Such closure of the switch 22 short-circuits the windings 16 directly thereby initiating further opening of the valve. In the initial part of this movement, the switch 41 is allowed to close thereby short-circuiting the windings 15 through the resistance 34. As a result the valve member 4 continues to move in the opening direction under the predominating effect of the windings 16 until the fully open position of the valve member is reached. At this time the switch 27 is opened by the cam 29 and the motor stopped although both sets of windings 15 and 16 remain short-circuited through the resistances 34 and 46.

When the heating requirements have been satisfied and the thermostat ceases to call for heat as evidenced by opening of its switch 22, the windings 16 become deenergized and operation of the motor in a direction to close the valve is initiated by the partially energized windings 15. Closure of the valve continues until the intermediate position is reached whereupon the switch 41 is opened and the operation of the motor interrupted with both sets of windings deenergized.

The three position and positive control of the regulating member in the manner above described provides for greater accuracy in the control of the flow of a conditioning medium than the on and off systems employed heretofore. The particular control shown embodies an arrangement of parts which is simple and inexpensive in construction and thoroughly reliable in operation through long periods of service use.

I claim as my invention:

1. The combination with a regulating member of, a sensitive control instrument responsive to a condition to be controlled and having two switches adapted to be closed in response to opposite changes in said condition, a power operator for actuating said member, two windings respectively operable to cause movement of said member in opposite directions having circuits respectively controlled by said switches and second switches respectively opened in different spaced positions of said member, an auxiliary circuit for energizing one of said windings through a resistance including a switch which is open when said member is in an intermediate position and is closed when the switch is disposed between said intermediate position and one of said first mentioned positions, an auxiliary circuit for energizing the other of said windings through a resistance including a switch which is open when said member is in said intermediate position and is closed when the member is disposed between such position and the other of said first mentioned positions, and two resistance elements corresponding in value to said resistances and respectively connected in parallel with the individual second switches.

2. In an air conditioning system having a regulating member movable back and forth between spaced limit positions through an intermediate position to govern the flow of a conditioning medium, a power operator for actuating said member, two windings controlling said operator, circuits for the respective windings each including a resistance and a switch, one of said switches being closed when said member is disposed between said intermediate position and one of said limit positions and the other switch being closed when the member is disposed between said intermediate position and the other limit position, a sensitive control instrument having two switches one controlling the circuit of one of said windings and arranged in parallel with the switch and the resistance therein, and the other controlling the other winding and arranged in parallel with the other switch and the associated resistance, and means for maintaining both of said windings energized to substantially equal degrees while said member is disposed in either of said limit positions with one of said instrument switches closed.

3. The combination with a regulating member movable between spaced limit positions through an intermediate position of, a sensitive control device responsive to a condition to be controlled and having two switches differently operated in response to opposite changes in said condition, a power operator for actuating said member, two windings controlling said operator and selectively energizable by the respective switches to cause movement of said member in opposite directions, means responsive to the movements of said member out of said intermediate position under the action of either one of said windings to effect energization of the other winding to a lesser degree whereby to cause return of said member to said intermediate position by the action of such other winding when the predominating winding is rendered ineffectual by said device and means rendered operative as an incident to movement of said member into one of its limit positions for maintaining said windings energized to substantially equal degrees while said member is disposed in either of said limit positions.

4. In an air conditioning system, the combination of a device movable between spaced limit positions through an intermediate position to regulate the supply of a conditioning medium, a condition responsive element movable in opposite directions in response to opposite changes in a condition to be controlled, two switches actuated by said element and arranged to be opened in one position of the element and respectively closed in response to movement of said element in opposite directions from such position, a power operator for actuating said device including electric motor driving means, circuit connections controlled by said thermostat and governing the operation of said driving means to cause said device to be moved to one of said limit positions when one of said switches is closed, to be moved to the other limit position when the other switch is closed, and to be moved to the intermediate position when both of said switches are open, and means rendered operative as an incident to movement of said device into either of said limit positions to arrest movement thereof and control the energization of said windings so as to maintain the position of said device without oscillation thereof.

5. In a conditioning system, the combination of a member movable in opposite directions to regulate the flow of a conditioning medium, a power operator for reversibly actuating said member including two windings respectively tending when rendered active to cause movement of said member in opposite directions, separate main circuits for the respective windings each having a control switch therein, a sensitive condition responsive element movable in opposite directions to open and close said switches at different conditions of the medium to which the element responds, means operable independently of said element to establish auxiliary circuits of greater resistance than said main circuit through one or the other of said windings, said auxiliary circuits acting jointly with said main circuits to cause movement of said member in one direction under the predominating action of one of said windings when both of the windings are energized and acting individually to effect reversal of the movement of said member when both of said main circuits become open, and means responsive to the movements of said member for controlling said auxiliary circuits to render one or the other of said windings effectual therethrough.

6. The combination with a regulating member of, a sensitive control instrument responsive to a condition to be controlled and having two switches adapted to be closed in response to opposite changes in said condition, a power operator for actuating said member including two control windings respectively operable to cause movement of said member in opposite directions having circuits respectively controlled by said switches, an auxiliary circuit for energizing one of said windings to a lesser degree including a switch which is open when said member is in an intermediate position and is closed when the switch is disposed between said intermediate position and one of two spaced limit positions, an auxiliary circuit for energizing the other of said windings to a lesser degree including a switch which is open when said member is in said intermediate position and is closed when the member is disposed between such position and the other limit position, and means rendered operative as an incident to movement of said member into one of its limit positions for maintaining said windings energized to substantially equal degrees while said member is disposed in either of said limit positions.

GEORGE FORREST DRAKE.